United States Patent
Kim et al.

(10) Patent No.: US 10,566,636 B2
(45) Date of Patent: Feb. 18, 2020

(54) END CELL HEATER ASSEMBLY AND FUEL CELL STACK HAVING THE SAME

(71) Applicants: HYUNDAI MOTOR COMPANY, Seoul (KR); KIA MOTORS CORPORATION, Seoul (KR); HANON SYSTEMS, Daedeok-gu, Daejeon (KR)

(72) Inventors: Ju Han Kim, Yongin-si (KR); Sun Heum Baek, Hwaseong-si (KR); Young Bum Kum, Seoul (KR); Dae Jong Kim, Yongin-si (KR); Kil Sang Jang, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 218 days.

(21) Appl. No.: 15/378,384

(22) Filed: Dec. 14, 2016

(65) Prior Publication Data

US 2017/0352900 A1   Dec. 7, 2017

(30) Foreign Application Priority Data

Jun. 3, 2016 (KR) .................. 10-2016-0069161

(51) Int. Cl.
*H01M 8/04225* (2016.01)
*H01M 8/04007* (2016.01)
*H01M 8/1018* (2016.01)
*H01M 8/2475* (2016.01)
*H01M 8/0432* (2016.01)

(52) U.S. Cl.
CPC ... *H01M 8/04225* (2016.02); *H01M 8/04037* (2013.01); *H01M 8/2475* (2013.01); *H01M 8/04373* (2013.01); *H01M 2008/1095* (2013.01)

(58) Field of Classification Search
CPC ......... H01M 8/04225; H01M 8/04037; H01M 8/04373; H01M 2008/1095
See application file for complete search history.

(56) References Cited

U.S. PATENT DOCUMENTS 6,649,293 B1 * 11/2003 Jones .................. H01M 8/0267
429/434
6,953,632 B2   10/2005 Hayashi et al.
(Continued)

FOREIGN PATENT DOCUMENTS

JP   2009-224042 A   10/2009
JP   2015-111545 A    6/2015
(Continued)

*Primary Examiner* — Lisa S Park
(74) *Attorney, Agent, or Firm* — Morgan, Lewis & Bockius LLP (57) ABSTRACT

An end cell heater assembly includes: a case which has a first surface joined to an end plate of a fuel cell stack; a planar heating element installed in an accommodating groove formed in a second surface of the case; a terminal plate which is stacked and interposed between the planar heating element and an end cell of the fuel cell stack, joined and electrically connected to the end cell, and transferring heat generated by the planar heating element to the end cell; and a terminal which is integrally formed with the terminal plate so as to output electrical energy generated by the fuel cell stack and transferred through the terminal plate, to the outside.

21 Claims, 5 Drawing Sheets

(56) References Cited

U.S. PATENT DOCUMENTS

| | | | |
|---|---|---|---|
| 2003/0022046 A1* | 1/2003 | Hayashi | H01M 8/0228 |
| | | | 429/435 |
| 2003/0031905 A1* | 2/2003 | Saito | H01M 8/04007 |
| | | | 429/429 |
| 2004/0053092 A1* | 3/2004 | Kato | H01M 8/04037 |
| | | | 429/414 |
| 2005/0058865 A1* | 3/2005 | Thompson | H01M 8/0258 |
| | | | 429/429 |
| 2006/0204820 A1* | 9/2006 | Cho | H01M 8/0247 |
| | | | 429/456 |
| 2010/0273083 A1 | 10/2010 | Yamamoto et al. | |
| 2015/0188158 A1* | 7/2015 | Kells | H01M 8/04037 |
| | | | 429/437 |

FOREIGN PATENT DOCUMENTS

| KR | 10-2011-0128639 A | 11/2011 |
|---|---|---|
| KR | 10-2012-0042224 | 5/2012 |
| KR | 10-2014-0076048 A | 6/2014 |
| KR | 10-2017-0037009 A | 4/2017 |

* cited by examiner

END CELL HEATER ASSEMBLY AND FUEL CELL STACK HAVING THE SAME

CROSS-REFERENCE TO RELATED APPLICATION

This application claims the benefit of priority to Korean Patent Application No. 10-2016-0069161, filed on Jun. 3, 2016 in the Korean Intellectual Property Office, the entire content of which is incorporated herein by reference.

TECHNICAL FIELD

The present disclosure relates to a fuel cell stack. More particularly, it relates to an end cell heater assembly and a fuel cell stack having the same, which are capable of solving a problem of deterioration in performance of an end cell of a fuel cell at the time of a cold start.

BACKGROUND

A fuel cell is an energy conversion device which converts chemical energy of fuel into electrical energy by electrochemically reacting a fuel gas and an oxidizing agent gas, and is used for industrial, domestic, and vehicle power sources, and the fuel cell may be used to supply electric power to small-sized electric/electronic products and mobile devices.

Research has been conducted on proton exchange membrane fuel cells (PEMFC, polymer electrolyte membrane fuel cells), which have high electric power density, as fuel cells for current vehicles.

Figure 1:
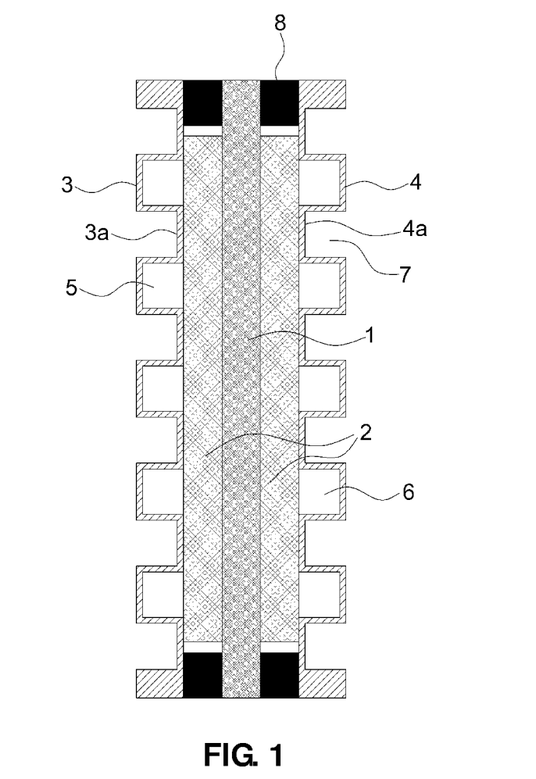
FIG. 1 is a cross-sectional view schematically illustrating a basic configuration of a unit cell of a polymer electrolyte membrane fuel cell.

FIG. 1 is a cross-sectional view schematically illustrating a basic configuration of a unit cell of a polymer electrolyte membrane fuel cell.

As illustrated, a membrane electrode assembly (MEA) 1, which is a main constituent component, is positioned at an innermost side of each unit cell of the fuel cell.

The membrane electrode assembly 1 includes a solid polymeric electrolyte membrane which may move hydrogen ions, and a cathode and an anode which are electrode layers on which catalysts are applied at both surfaces of the electrolyte membrane so that hydrogen and oxygen may react.

Gas diffusion layers (GDL) 2 are stacked at the outside of the membrane electrode assembly 1, that is, the outside where the cathode and the anode are positioned, and bipolar plates 3 and 4, which have flow paths through which reactant gases (hydrogen which is a fuel gas, and oxygen or air which is an oxidizing agent gas) are supplied and a coolant passes, are positioned at the outside of the gas diffusion layers 2.

Gaskets 8 and the like for fluid sealing are interposed and stacked between the bipolar plates 3 and 4, and the gaskets 8 may be formed integrally with the membrane electrode assembly 1 or the bipolar plates 3 and 4.

Assuming that based on the membrane electrode assembly 1 in FIG. 1, a left bipolar plate 3 is an anode bipolar plate, and a right bipolar plate 4 is a cathode bipolar plate, channels 5 between the gas diffusion layer 2 joined to the anode of the membrane electrode assembly 1 and the anode bipolar plate 3 are anode channels through which hydrogen, which is a fuel gas, flows.

Channels 6 between the gas diffusion layer 2 joined to the cathode of the membrane electrode assembly 1 and the cathode bipolar plate 4 are cathode channels through which air (oxygen), which is an oxidizing agent gas, flows, and spaces, which are formed by bipolar plate land portions 3a and 4a between the neighboring anode channels 5 and between the neighboring cathode channels 6, are coolant channels 7.

This configuration is applied as a unit cell, a plurality of cells is stacked, end plates (not illustrated), which support the cells, are coupled at outermost sides of the cells, and the end plates and the cells are fastened together by a stack fastening mechanism (not illustrated) in a state in which the cells are stacked and arranged between the end plates, thereby configuring a fuel cell stack.

Each of the unit cells maintains a low voltage in operation, and as a result, dozens or hundreds of cells are manufactured in the form of a stack by being stacked in series in order to increase voltage, and used as an electric generator.

Figure 2:
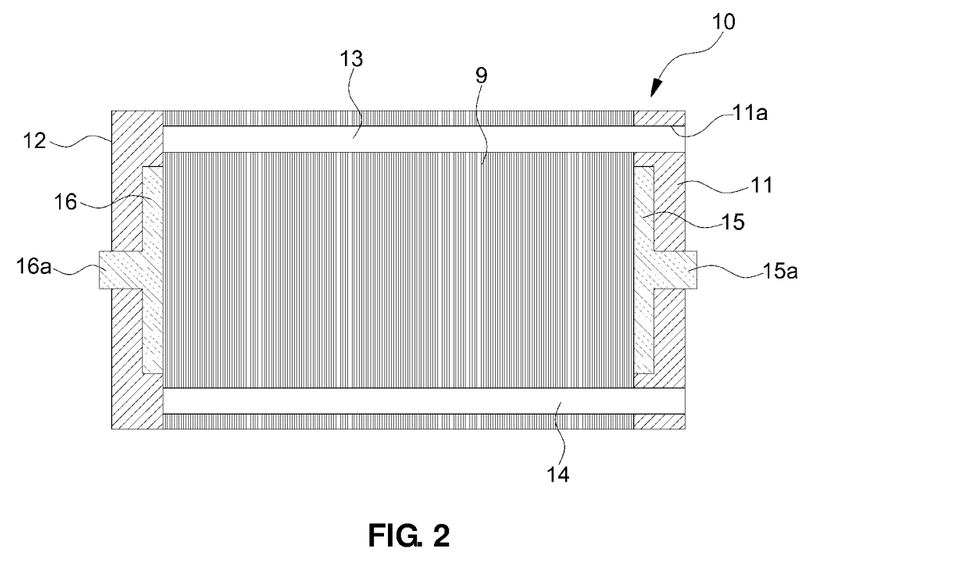
FIG. 2 is a cross-sectional view schematically illustrating a publicly known fuel cell stack configured by stacking cells.

FIG. 2 is a cross-sectional view schematically illustrating a fuel cell stack configured by stacking cells, and end plates are coupled to both ends of a stack 10, which are outer sides of cells 9, in a state in which the cells 9 are stacked.

In this case, a penetrated end plate 11, which has a manifold hole 11a, may be coupled to one end of both ends of the stack 10, and a non-penetrated end plate 12, which has no manifold hole, may be coupled to the other end opposite to the one end.

In this configuration, when hydrogen, air, and a coolant, which are supplied through inlet manifolds 13 of the stack 10 (the inlet manifolds for hydrogen, air, and a coolant are separated from each other), are distributed into the respective cells 9 through the flow paths of the bipolar plates, the hydrogen, the air, and the coolant pass through the anode channels, the cathode channels, and the coolant channels, respectively, which are flow paths of the bipolar plates in each of the cells, and thereafter, foreign substances such as unreacted gas, nitrogen, and water, and the coolant are discharged from the respective cells 9 and the stack 10 through an outlet manifold 14.

Current collecting plates 15 and 16, which have terminals 15a and 16a, respectively, are provided in the end plates 11 and 12, respectively.

The current collecting plates 15 and 16 are electrically connected to the bipolar plates of end cells positioned therein, and output electric current, which is generated by a fuel cell reaction in all of the cells 9 in the stack 10, to the outside through the terminals 15a and 16a.

In the polymer electrolyte membrane fuel cell, water (produced water) is inevitably produced at the cathode side as a result of the reaction between the fuel gas (hydrogen in the reactant gas) supplied to the anode channel and the oxidizing agent gas (air or oxygen in the reactant gas) supplied to the cathode channel.

When the produced water remaining in the cells after stopping the operation of the fuel cell is left at a low temperature, the produced water may be frozen, and may then block pores of the gas diffusion layer (GDL) and the channels of the bipolar plate (flow paths of the reactant gas).

For this reason, the reactant gas cannot flow smoothly at the time of a cold start, and as a result, the fuel cell cannot operate normally, and starting time may be delayed.

Therefore, to ensure cold start performance and shorten starting time, it may be necessary to melt frozen moisture using electrochemical reaction heat from the fuel cell itself, and to melt frozen moisture using additional means such as a separate heating source.

Figure 3:
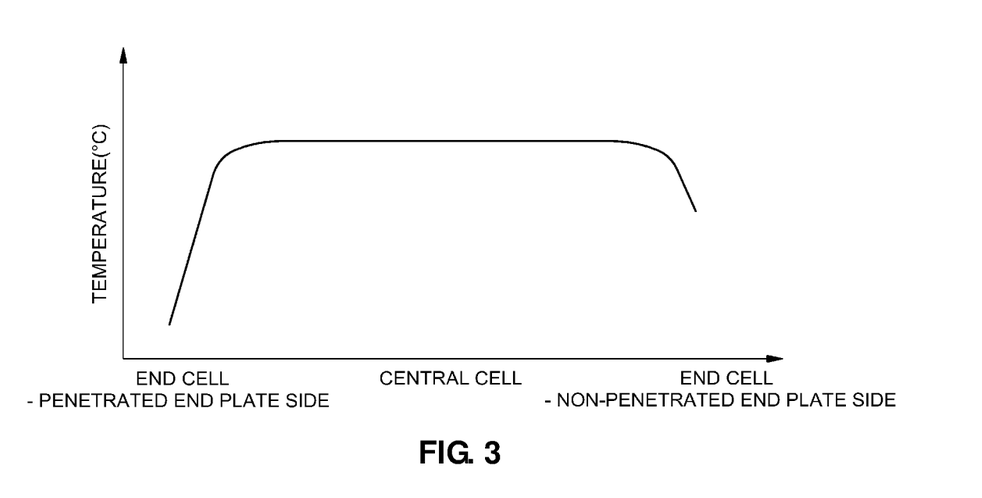
FIG. 3 is a view illustrating temperature distribution of the cells under a normal operating condition of a fuel cell stack.

FIG. 3 is a view illustrating a temperature distribution of the cells under a normal operating condition of the fuel cell stack.

Since the fuel cell stack is configured by the plurality of unit cells, the end plates having high rigidity are used in order to press and fasten the cells with uniform pressure.

The end plate is manufactured using a material such as metal having high thermal mass in order to maintain high rigidity, and as a result, as illustrated in FIG. 3, even in a case in which the fuel cell operates normally, an operating temperature of the cell at an end of the stack, which is adjacent to the end plate, is lower than that of the cells inside the stack, thereby showing lower electric power generation efficiency.

In particular, because of heat loss, the cells at the end of the stack require a longer amount of time in order to melt the frozen water at the time of a cold start, which causes a delay in the starting time.

It has been reported that voltage of the cells at both ends of the stack may be greatly lower than that of the cells inside the stack under a cold start condition of the fuel cell.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and to provide an end cell heater assembly and a fuel cell stack having the same, which are capable of solving a problem of deterioration in performance of an end cell of a fuel cell at the time of a cold start.

In one aspect, the present disclosure provides an end cell heater assembly which performs a heating operation by being supplied with electric power from a power source, is stacked and interposed between end cells, which are stacked to be positioned at both ends among a plurality of stacked fuel cells that generates electrical energy through an electrochemical reaction by being supplied with reactant gas in a fuel cell stack, and end plates at both ends of the fuel cell stack so as to provide heat to the respective end cells at the time of the heating operation in order to increase a temperature of the end cell, and has a bypass flow path so that at least one gas of air and hydrogen supplied to the fuel cell stack as reactant gases is distributed to and passes through the bypass flow path.

In another aspect, the present disclosure provides a end cell heater assembly includes: a case which has a first surface joined to an end plate of a fuel cell stack; a planar heating element installed in an accommodating groove formed in a second surface of the case; a terminal plate which is stacked and interposed between the planar heating element and an end cell of the fuel cell stack, joined and electrically connected to the end cell, and transferring heat generated by the planar heating element to the end cell; and a terminal which is integrally formed with the terminal plate so as to output electrical energy generated by the fuel cell stack and transferred through the terminal plate, to the outside.

In another aspect, the present disclosure provides a fuel cell stack including: a plurality of fuel cells which is provided by being stacked, and generates electrical energy through an electrochemical reaction by being supplied with reactant gases; end plates which are stacked at both end positions of the fuel cell stack outside the stacked fuel cells; and an end cell heater assembly which performs a heating operation by being supplied with electric power, is stacked and interposed between end cells, which are stacked to be positioned at both ends among the stacked fuel cells, and end plates at both ends of the fuel cell stack so as to provide heat to the respective end cells at the time of the heating operation in order to increase a temperature of the end cell, and has a bypass flow path so that at least one gas of air and hydrogen supplied to the fuel cell stack as reactant gases is distributed to and passes through the bypass flow path.

Accordingly, the end cell heater assembly and the fuel cell stack according to the present disclosure may provide effects of increasing a temperature of the end cell positioned at both end portions of the stack under a cold start condition of the fuel cell, preventing deterioration in performance caused by heat loss of the end cell, improving distribution properties of the reactant gas at the end cell, preventing an inflow of droplets (bypassing droplets that flow in), reducing cold start time, improving cold start output, and preventing a drop of voltage and a loss of electric power caused by the existing dummy cell.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings so that those skilled in the art to which the present disclosure pertains may easily carry out the exemplary embodiments. However, the present disclosure is not limited to the exemplary embodiments to be described below and may be specified as other aspects.

Unless otherwise described, the word "comprise" and variations such as "comprises" or "comprising" will be understood to imply the inclusion of stated elements, not the exclusion of any other elements.

For reference, to help understand the present disclosure before describing the exemplary embodiment, a fuel cell stack having dummy cells will be described first.

Figure 4:
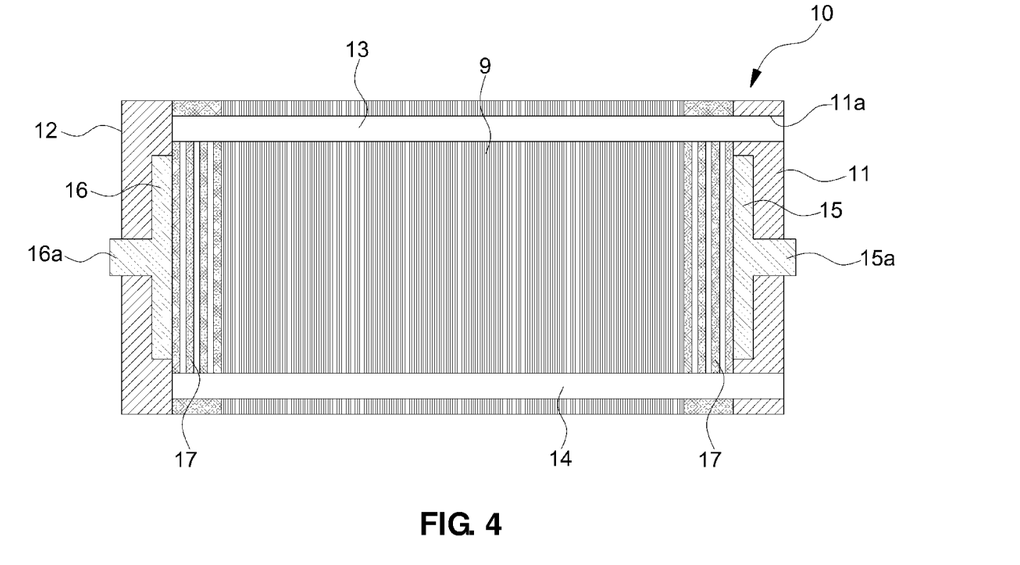
FIG. 4 is a cross-sectional view illustrating a fuel cell stack having dummy cells.

FIG. 4 is a cross-sectional view illustrating the fuel cell stack having dummy cells.

As illustrated, end plates 11 and 12 are coupled to both ends of a stack 10, which are outer sides of cells 9, in a state in which the cells 9 are stacked.

In this case, a penetrated end plate 11, which has a manifold hole 11a, may be coupled to one end of both ends of the stack 10, and a non-penetrated end plate 12, which has no manifold hole, may be coupled to the other end opposite to the one end.

In this configuration, when hydrogen, air, and a coolant, which are supplied through inlet manifolds 13 of the stack 10 (the inlet manifolds for hydrogen, air, and a coolant are separated from each other), are distributed into the respective cells 9 through bipolar plates, the hydrogen, the air, and the coolant pass through anode channels, cathode channels, and coolant channels, respectively, which are flow paths of the bipolar plates in each of the cells 9, and thereafter, foreign substances such as unreacted gas, nitrogen, and water, and the coolant are discharged from the cells 9 and the stack 10 through an outlet manifold 14.

Current collecting plates 15 and 16, which have terminals 15a and 16a, respectively, are provided in the end plates 11 and 12, respectively, and the current collecting plates 15 and 16 are electrically connected to the bipolar plates of the dummy cells 17 positioned therein, and output electric current, which is generated by a fuel cell reaction in all of the cells 9 in the stack 10, to the outside through the terminals 15a and 16a.

Several cells in the stack 10, which are adjacent to the respective end plates 11 and 12 of the stack 10, are configured as the dummy cells 17 and 18 in order to improve distribution properties of the reactant gas at end cells positioned at both ends of the stack 10 (cells positioned at ends of the stack 10 among reaction cells to be described below), and to bypass and discharge droplets that flow in.

Therefore, the cells, which constitute the stack 10, may be classified into the reaction cells (unit cells having a typical configuration) 9 which generate electrical energy through an electrochemical reaction by being supplied with the reactant gas, and the dummy cells 17 which are stacked at both end portions of the reaction cells 9.

Unlike the reaction cell 9 which has a typical configuration including the anode bipolar plate, the gas diffusion layer (GDL), the membrane electrode assembly (MEA), the gas diffusion layer, and the cathode bipolar plate, the dummy cell 17 has no membrane electrode assembly, and uses a dummy cell dedicated bipolar plate.

Hereinafter, the reaction cell, which is positioned at the end adjacent to the dummy cell among the reaction cells 9, is referred to as an end cell, and the plurality of dummy cells 17 is additionally stacked between the end plates 11 and 12 outside the end cells having a typical configuration of the unit cell, thereby configuring the stack 10.

In this case, dummy cell dedicated bipolar plates, which are positioned at outermost ends among the dummy cells 17 stacked at the end portions of the stack 10, are electrically connected to the current collecting plates 15 and 16 installed on the end plates 11 and 12.

When comparing the dummy cell dedicated bipolar plate with the bipolar plate of the reaction cell 9, the bipolar plate of the reaction cell 9 has inlet and outlet manifold holes through which the respective reactant gases and the coolant flow in and out, and channels which are flow paths of the respective reactant gases and the coolant so that hydrogen which is the fuel gas, air which is the oxidizing agent gas, and the coolant may flow into, pass through, and be discharged from the inlet and outlet manifold holes and the channels, but the dummy cell dedicated bipolar plate only has inlet and outlet manifold holes and a channel for hydrogen which is the fuel gas, or inlet and outlet manifold holes and a channel for air which is the oxidizing agent gas.

Therefore, the stack 10 needs to be assembled by separately and repeatedly stacking only the plurality of gas diffusion layers and the plurality of dummy cell dedicated bipolar plates at both end portions of the stack 10 in order to constitute the dummy cell 17, and as a result, there is a disadvantage in mass production of the fuel cell stack through utilization of an automatic stacking facility.

Furthermore, since the dummy cell dedicated bipolar plate is additionally required, additional production facilities for producing the dedicated bipolar plate are required, and because of the gas diffusion layer stacked between the dummy cell dedicated bipolar plates in view of a stacking sequence in which the plurality of dummy cells 17 is constituted, a drop of voltage and a loss of electric power occur when electric power generated by the reaction cell 9 of the fuel cell is outputted to the outside through the current collecting plates 15 and 16.

When the coolant flows between the dummy cells in a state in which the plurality of dummy cells 17 is provided, an operating temperature of the end cells positioned at both ends of the reaction cell 9 is decreased, and particularly, operating efficiency may further deteriorate because of the coolant cooled under a cold start condition of the fuel cell.

Therefore, the end cell heater assembly is disclosed which increases a temperature of the end cell positioned at the end of the reaction cell of the fuel cell stack.

The end cell heater assembly according to the present disclosure provides effects of increasing a temperature of the end cell positioned at both end portions of the stack under a cold start condition of the fuel cell, preventing deterioration in performance caused by heat loss of the end cell, improving distribution properties of the reactant gas at the end cell, preventing an inflow of droplets, and preventing a drop of voltage and a loss of electric power caused by the existing dummy cell.

Figure 5:
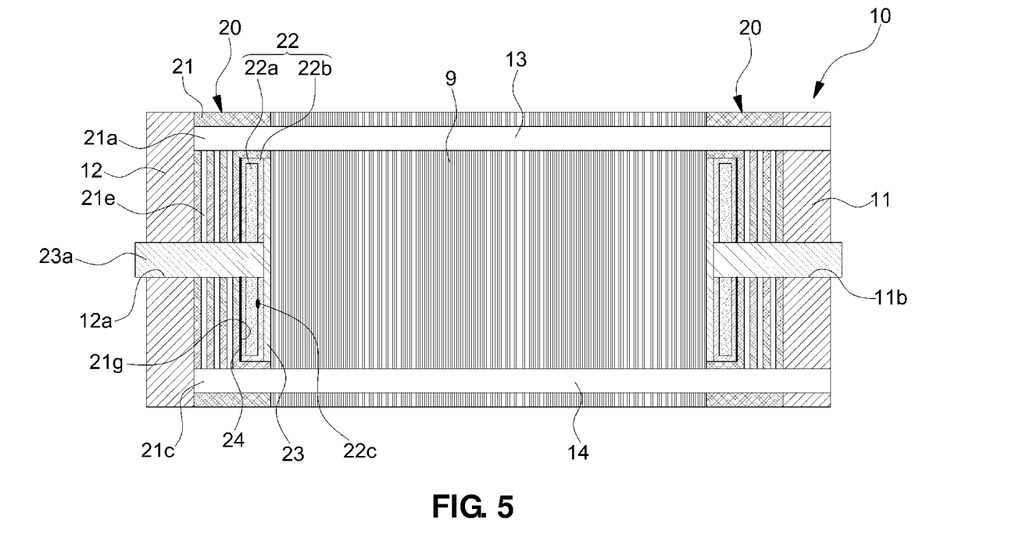
FIG. 5 is a cross-sectional view schematically illustrating a configuration of a fuel cell stack according to an exemplary embodiment of the present disclosure.

FIG. 5 is a cross-sectional view schematically illustrating a configuration of a fuel cell stack according to an exemplary embodiment of the present disclosure.

As illustrated, the fuel cell stack 10 according to the exemplary embodiment of the present disclosure has a structure in which reaction cells 9 including the membrane electrode assemblies (MEA), the gas diffusion layers (GDL), the cathode bipolar plates, the anode bipolar plates, and the gaskets are stacked, and each of the reaction cells 9 produces electrical energy through an electrochemical reaction by being supplied with the reactant gas.

The membrane electrode assembly in each of the reaction cells 9 includes a solid polymeric electrolyte membrane which may move hydrogen ions, and a cathode and an anode which are electrode layers on which catalysts are applied at both surfaces of the electrolyte membrane so that hydrogen and oxygen may react.

The gas diffusion layers (GDL) are stacked at the outside of the membrane electrode assembly in each of the reaction cells 9, that is, the outside where the cathode and the anode are positioned, and the bipolar plates, which have flow paths through which reactant gases (hydrogen which is the fuel gas, and oxygen or air which is the oxidizing agent gas) are supplied and the coolant passes, are positioned at the outside of the gas diffusion layers.

The gaskets or the like for fluid sealing are interposed and stacked between the bipolar plates, and the gaskets may be formed integrally with the membrane electrode assembly or the bipolar plate.

Channels between the gas diffusion layer joined to the anode of the membrane electrode assembly and the anode bipolar plate are anode channels through which hydrogen, which is the fuel gas, flows, and channels between the gas diffusion layer joined to the cathode of the membrane electrode assembly and the cathode bipolar plate are cathode channels through which air (oxygen), which is the oxidizing agent gas, flows, and spaces, which are formed by bipolar plate land portions between the neighboring anode channels and between the neighboring cathode channels, are coolant channels.

In this configuration, hydrogen, air, and a coolant, which are supplied through the inlet manifolds 13 of the fuel cell stack 10, are distributed to the respective reaction cells 9 through the respective bipolar plates, the hydrogen, the air, and the coolant pass through the anode channels, the cathode channels, and the coolant channels, which are flow paths of the bipolar plates in each of the reaction cells 9, and thereafter, foreign substances such as unreacted gas, nitrogen, and water, and the coolant are discharged from the respective reaction cells 9 and the stack 10 through the outlet manifold 14.

End cell heater assemblies 20 are stacked and inserted between the respective end plates 11 and 12 and the reaction cells 9 at both end portions of the fuel cell stack 10.

The end cell heater assemblies 20, which are installed at both end portions of the fuel cell stack 10, respectively, have similar configurations, and as a result, the following description will be made without distinguishing the two end cell heater assemblies.

Figure 6:
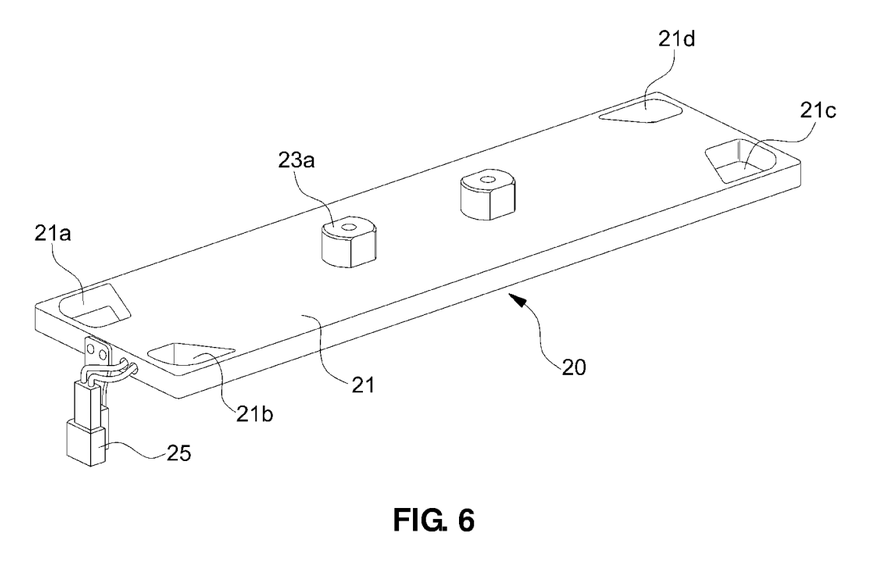
FIG. 6 is an assembled perspective view illustrating an end cell heater assembly according to the exemplary embodiment of the present disclosure.
Figure 7:
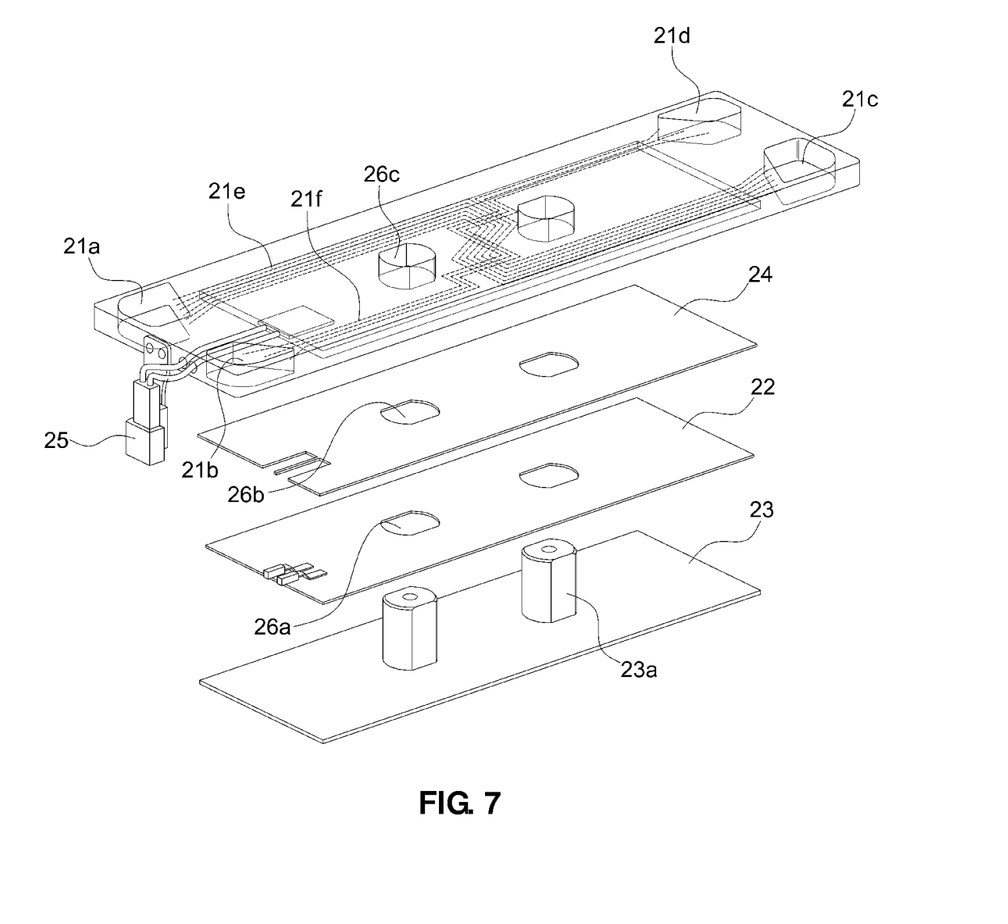
FIG. 7 is an exploded perspective view of the end cell assembly according to the exemplary embodiment of the present disclosure.

The end cell heater assembly 20 includes a case 21, a planar heating element 22 for heating the end cell, a current collecting terminal plate 23, and a terminal 23a.

First, the case 21 has inlet manifold holes 21a and 21b and outlet manifold holes 21c and 21d which are penetratively formed at both end portions thereof, and bypass flow paths 21e and 21f which are formed to penetrate the interior so that the end cell heater assembly 20 may function as a dummy cell which includes a metallic bipolar plate in a publicly known fuel cell stack.

Here, the bypass flow paths 21e and 21f include at least one channel.

In more detail, the bypass flow paths 21e and 21f may include a single channel or a plurality of channels formed to allow hydrogen which is the fuel gas or air which is the oxidizing agent gas to pass therethrough, or may include channels formed to allow the hydrogen and the air to pass therethrough, respectively.

In this case, the inlet manifold holes 21a and 21b and the outlet manifold holes 21c and 21d are formed at both end portions of the case 21 for the respective channels, and the channels are formed to connect the inlet manifold holes 21a and 21b and the outlet manifold holes 21c and 21d.

That is, the case 21 may include at least one hydrogen channel 21e or at least one air channel 21f which connects the inlet manifold holes 21a and 21b and the outlet manifold holes 21c and 21d, or may include both of the hydrogen channel 21e and the air channel 21f.

Even in a case in which the case 21 includes both of the hydrogen channel 21e and the air channel 21f, a single hydrogen channel 21e or a plurality of hydrogen channels 21e may be formed, and a single air channel 21f or a plurality of air channels 21f may be formed.

In the case of the reaction cell 9 in the fuel cell stack, flow paths formed on surfaces of the bipolar plates form the channels for the respective reactant gases and the coolant in a state in which the cells are stacked, but the bypass flow paths 21e and 21f of the case 21, that is, the channels 21e and 21f of the case 21 are internal penetrating flow paths which penetrate the interior of the case.

In the present exemplary embodiment, the case 21 may include a plurality of plates which are assembled by being stacked on one another, and in this case, the stacked and assembled plates may have groove-shaped flow paths which are formed on the surfaces thereof along predetermined pathways so as to form the channels 21e and 21f which are the internal penetrating flow paths.

In this case, flow paths for forming the channels 21e and 21f may be formed on a surface of one plate of the two plates which are joined to each other and stacked so as to form the channels 21e and 21f, or flow paths for forming individual channels may be formed on both surfaces of the two plates which are joined to each other.

Groove-shaped flow paths are formed along the same pathway on surfaces of the two plates which are joined to each other, such that when the two plates are stacked and joined, the two flow paths formed on the surfaces of both of the plates which are joined to each other are combined to form one sealed individual channel.

An exemplary embodiment in FIG. 7 is an exemplary embodiment in which two bypass flow paths 21e and 21f, that is, the hydrogen channel 21e and the air channel 21f, through which hydrogen and air may pass and flow, respectively, are provided in the case 21, and as an example, if the case 21 has the hydrogen channel 21e and the air channel 21f as illustrated in FIG. 7, three plates may be stacked to configure the case although not illustrated.

In more detail, groove-shaped flow paths for forming the hydrogen channel 21e having a predetermined pathway are formed along the same pathway on two surfaces of the two plates which are joined to each other and stacked on each other among the three plates that constitute the case 21, such that when the two plates are stacked and joined, the flow paths formed on the surfaces of the two plates are combined to form one sealed flow path, that is, the hydrogen channel 21e.

In this case, groove-shaped flow paths for forming the air channel 21f having a predetermined pathway are formed along the same pathway on two surfaces of the two plates which are joined to each other and stacked on each other among the three plates, such that when the two plates are stacked and joined, the flow paths formed on the surfaces of the two plates are combined to form one sealed flow path, that is, the air channel 21f.

Of course, in the case of the intermediate plate among the three plates, flow paths may be formed on both surfaces of the plate, and the flow path formed on one surface of the plate, which has the flow paths formed on both surfaces thereof, is used to form the hydrogen channel 21e, and the flow path formed on the other surface is used to form the air channel 21f.

The aforementioned example is just an example for configuring the case 21, and the number of hydrogen channels 21e and air channels 21f which are provided in the case 21 as the bypass flow paths, the number of plates which are stacked to configure the case 21, the number of flow paths which are formed in the respective plates and have predetermined pathways, and whether the flow paths are formed on one surface of the plate or both surfaces of the plate are not particularly limited but variously changed and modified and then carried out and applied, and the present disclosure is not limited to the illustrated exemplary embodiment.

As illustrated, the inlet manifold holes 21a and 21b formed at both end portions of the case 21 are configured as a hydrogen inlet manifold hole 21a and an air inlet manifold hole 21b, and the outlet manifold holes 21c and 21d are configured as a hydrogen outlet manifold hole 21c and an air outlet manifold hole 21d.

The inlet manifold holes 21a and 21b and the outlet manifold holes 21c and 21d of the case 21 communicate with the inlet manifold 13 and the outlet manifold 14 of the reaction cell 9, respectively.

Here, the hydrogen inlet manifold hole 21a and the hydrogen outlet manifold hole 21c of the case 21 become parts of the hydrogen inlet manifold and the hydrogen outlet manifold of the fuel cell stack 10, respectively, and communicate with the hydrogen inlet manifold 13 and the hydrogen outlet manifold 14, respectively, which are formed by the bipolar plates of the reaction cells 9 which are stacked.

The air inlet manifold hole 21b and the air outlet manifold hole 21d of the case 21 become parts of the air inlet manifold and the air outlet manifold of the fuel cell stack 10, respectively, and are connected to the cathode inlet manifold and the cathode outlet manifold formed by the bipolar plates of the reaction cells 9 which are stacked.

The hydrogen channels 21e of the bypass flow paths are connected to the hydrogen inlet manifold hole 21a and the outlet manifold hole 21c of the case 21, and in this case, the respective hydrogen channels 21e are formed to penetrate the interior of the case 21 so as to connect the hydrogen inlet manifold hole 21a and the hydrogen outlet manifold hole 21c.

The air channels 21f of the bypass flow paths are connected to the air inlet manifold hole 21b and the air outlet manifold hole 21d of the case 21, and in this case, the respective air channels are formed to penetrate the interior of the case 21 so as to connect the air inlet manifold hole 21b and the air outlet manifold hole 21d.

Therefore, hydrogen, which is the fuel gas flowing in through the hydrogen inlet manifold 13 at the side of the reaction cell 9, is distributed and flows into the hydrogen channel 21e of the bypass flow paths through the hydrogen inlet manifold hole 21a of the case 21, and the hydrogen is discharged to the hydrogen outlet manifold hole 21c of the case 21, and then discharged to the outside of the stack 10 through the hydrogen outlet manifold 14 at the side of the reaction cell 9.

Likewise, air (oxidizing agent gas) inflowing through the air inlet manifold at the side of the reaction cell 9 is distributed and flows into the air channel 21f of the bypass flow paths through the air inlet manifold hole 21b of the case 21, and the air is discharged to the air outlet manifold hole 21d of the case 21, and then discharged to the outside of the stack through the air outlet manifold at the side of the reaction cell 9.

Since the bypass flow paths 21e and 21f are provided in the case 21 of the end cell heater assembly 20 according to the present invention as described above, it is possible to bypass droplets or the like flowing into the fuel cell stack to a gas outlet through the bypass flow paths 21e and 21f, and thus to improve distribution properties of the reactant gas.

Meanwhile, as illustrated in FIG. 7, a connector 25 is installed on the case 21, such that electric power may be supplied to the planar heating element 22 through the connector 25, and the connector 25 serves to accommodate the planar heating element 22 and accessories such as a current collector (a terminal plate 23 to be described below).

In the exemplary embodiment, the case 21 may be formed and manufactured by using a synthetic resin (plastic) material, which is an electrically non-conductive material, more particularly, an electrically and thermally non-conductive material, in order to ensure a thermal insulation effect for the end cell, minimize heat loss of the heater toward the end plates 11 and 12, and ensure electrical insulation.

One surface of the case 21 is joined to the end plates 11 and 12, and the other surface opposite to the one surface is joined to and stacked on the reaction cell 9, and an accommodating groove 21g into which the planar heating element 22 and the terminal plate 23 may be inserted is formed on the surface to which the reaction cell 9 is joined.

That is, the planar heating element 22 and the terminal plate 23 are accommodated in the accommodating groove 21g of the case 21 in a state in which the planar heating element 22 and the terminal plate 23 are stacked, and the planar heating element 22 is inserted into the accommodating groove 21g of the case 21, and then the terminal plate 23 is joined to and stacked on the planar heating element 22.

In the exemplary embodiment, a thermal insulation pad 24 may be stacked and interposed between the planar heating element 22 and an inner surface of the accommodating groove 21g of the case 21.

The planar heating element 22 is a heating means in which an outer surface of a heating element 22a is coated with a sheath 22b made of an electrically insulating material so as to be completely and electrically insulated from the outside, and the connector 25 connected with an external power source is connected with one side of the planar heating element 22 so that the planar heating element 22 may be supplied with operating electric power from the external power source.

In particular, since the terminal plate 23 is joined to and stacked on one surface of the planar heating element 22, a complete electrical insulation state of the terminal plate 23 and the heating element 22a may be maintained by the sheath 22b outside the heating element 22a.

The fuel cell stack may be the external power source that supplies operating electric power to the planar heating element 22, and in this case, an electric power supply circuit unit (not illustrated), which adjusts generated electric power outputted from the fuel cell stack 10 and supplies the electric power to the connector 25, may be provided.

In a case in which the fuel cell stack 10 is used as the power source for the planar heating element 22, it is possible to more quickly melt the residual produced water frozen in the cell 9 at the time of a cold start because of a heating effect by the planar heating element 22 and a heating effect of the stack itself caused by electrochemical reaction heat of the cell 9.

Of course, instead of the fuel cell stack 10, other power sources, for example, a battery (not illustrated) in the vehicle may be used, and in this case, the electric power supply circuit unit is configured such that the planar heating element 22 is supplied with operating electric power from the battery through the connector 25.

It is advantageous for the planar heating element 22 to have a thin film structure in order to improve output density compared to a volume of the stack 10, and as the internal heating element 22a, a resistance heating element, which is manufactured as a metallic thin film or manufactured by a method such as carbon nano tube (CNT) printing, may be used, or a PTC (Positive Temperature Coefficient) element, which may control a temperature and autonomously prevent overheating, may be used.

The heating element using the PTC element is advantageous in that the following temperature sensor and the following method of controlling, by a control unit, the heating element based on a signal from the temperature sensor are not required because the heating element becomes a heating element that autonomously limits a maximum heating temperature.

A separate temperature sensor 22c may be provided at the periphery of the heating element 22a, and a controller (not illustrated, the controller performs operating electric power supply control through the electric power supply circuit unit), which controls an operation of the planar heating element 22, receives a signal from the temperature sensor 22c, and the controller may control a heating temperature based on the signal from the temperature sensor 22c when the heating element operates.

In this case, the temperature sensor 22c may be utilized to measure a temperature of the end cell at the outermost side when the heating element 22a does not operate.

The terminal 23a, which is assembled to sequentially penetrate the planar heating element 22, the thermal insulation pad 24, the case 21, and the end plates 11 and 12, is formed integrally with one surface of the terminal plate 23, and through holes 26a, 26b, and 26c through which the terminal 23a passes are formed in the planar heating element 22, the thermal insulation pad 24, the case 21, and the end plates 11 and 12.

The through hole 26c of the case 21 is penetratively formed in a portion of the case 21 where the hydrogen channel 21e and the air channel 21f are not formed, and the through hole 26a of the planar heating element 22 needs to be formed such that the terminal 23a, which passes through the through hole 26a, is not electrically connected with the internal heating element 22a.

To this end, a through hole, which is larger than a cross-sectional area of the terminal 23a, is formed in the internal heating element 22a, and an inner circumferential portion of the through hole of the internal heating element 22a is completely coated with the sheath 22b, such that a completely electrically insulated state may be maintained between the terminal 23a and the internal heating element 22a.

Alternatively, the internal heating elements 22a may be separately disposed around the through hole 26a, and the heating elements 22a may be electrically connected through portions (positions where electrical insulation is enabled) spaced apart from the through hole 26a and the terminal 23a.

The terminal plate 23 may be in direct contact with the cell disposed at the outermost periphery, that is, the end cell among the stacked reaction cells 9, and may also be in contact with the bipolar plate of the end cell, or may be in contact with the gas diffusion layer (GDL) of the end cell in a state in which the bipolar plate is omitted.

In summary, one surface of the planar heating element 22 is in contact with the terminal plate 23, the terminal 23a is formed integrally with one surface of the terminal plate 23, one surface of the terminal plate 23 is in contact with the planar heating element 22, and the other surface of the terminal plate 23 is in direct surface contact with the reaction cell 9, that is, the end cell.

The terminal plate 23 is manufactured by using an electrically conductive and thermally conductive material, and the terminal plate 23 serves as a current collecting plate which receives electric power generated by the reaction cell in a state of being directly joined to the reaction cell 9, and serves to transfer heat generated by the planar heating element 22 to the end cell.

As described above, the configuration of the end cell heater assembly, in which the bypass flow paths (case), the planar heating element for heating the end cell, the current collecting terminal plate, and the terminal are integrally assembled, has been described.

In the fuel cell stack 10 to which the end cell heater assembly 20 having the aforementioned configuration is applied, the electric power generated by the reaction cells 9 stacked inside the fuel cell stack may be outputted to the outside through the terminal plate 23 and the terminal 23a.

When the planar heating element 22 performs a heating operation under a cold start condition of the fuel cell stack 10, thermal energy is supplied directly to the end cell, thereby quickly increasing a temperature of the end cell.

When the end cell is heated by the end cell heater assembly 20, moisture (produced water), which remains frozen in the end cell, may be quickly melted at the time of a cold start, and the reactant gas flows smoothly, such that a drop of voltage at both ends of the cell and deterioration in stack performance caused by the drop of voltage may be prevented, and starting time may be shortened.

If the end cell heater assembly 20 is installed, the occurrence of heat loss to the end plates 11 and 12 having a high thermal capacity during the operation of the fuel cell may be prevented, and heat loss may be compensated during the heating operation, such that power generation efficiency may be improved, and uniform cell performance may be ensured.

The bypass flow paths 21e and 21f are integrally provided in the end cell heater assembly 20 in order to improve distribution properties of the reactant gas and bypass droplets flowing in, such that the bypass flow paths 21e and 21f function as a dummy cell in a publicly known fuel cell stack, and as a result, distribution properties of the reactant gas may be improved in the reaction cell 9, droplet inflow may be prevented, and problems in the related art, which occur when the existing dummy cell is applied, may be solved.

That is, in the publicly known fuel cell stack, the current collecting plate of the end plate is connected to the metallic bipolar plate of the dummy cell, and as a result, a drop of voltage and a loss of electric power may occur as the electric power generated by the reaction cell is outputted through the metallic bipolar plate of the dummy cell, the current collecting plate, and the terminal, but in the fuel cell stack 10 to which the end cell heater assembly 20 according to the present disclosure is applied, electric power of the reaction cell 9 is outputted through the terminal plate 23 directly connected to the reaction cell 9 and the terminal 23a that penetrates the end plates 11 and 12, and as a result, it is possible to solve the problems of a drop of voltage and a loss of electric power which occur when the existing dummy cell having the dedicated metallic bipolar plate and the gas diffusion layer is applied.

In addition, when the end cell heater assembly is assembled in advance, the cells are stacked, and then stack assembling is performed, the end cell heater assembly 20 may be simply assembled by stacking and interposing the end cell heater assembly 20 between the reaction cells 9 and the end plates 11 and 12, and as a result, it is possible to omit the existing complicated process of stacking the dummy cells, and thus to reduce production time, improve mass production and productivity, and prevent erroneous assembly during a stacking process.

A process of assembling the fuel cell stack according to the exemplary embodiment of the present disclosure will be described, and in a state in which the end cell heater assembly 20 is assembled in advance, the end cell heater assembly 20 and the end plates 11 and 12 are temporarily assembled by inserting the terminal 23a into the through holes (reference numerals 11b and 12a in FIG. 5) of the end plates 11 and 12, or the end cell heater assembly 20 and the end plates 11 and 12 are integrally assembled by using a separate fastening mechanism.

The plurality of reaction cells 9 is stacked on the terminal plate 23 of the end cell heater assembly 20, and the opposite end cell heater assembly 20 and the end plates 11 and 12, which are assembled in the same manner, are stacked on the reaction cells 9.

When the stacking process is completed as described above, the end plates 11 and 12 at both sides of the stack 10 are connected and fastened to each other by means of a publicly known stack fastening mechanism (not illustrated) in a state in which the stack 10 is pressed, thereby integrally forming the configuration of the stack.

In this assembling process, since the complicated process of stacking the dummy cells is omitted in comparison with the existing process, it is possible to prevent erroneous assembly, and greatly reduce production time.

The disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An end cell heater assembly, comprising:
   a case which has a first surface joined to an end plate of a fuel cell stack;
   a planar heating element installed in an accommodating groove formed in a second surface of the case;
   a terminal plate which is stacked and interposed between the planar heating element and an end cell of the fuel cell stack, joined and electrically connected to the end cell, and transferring heat generated by the planar heating element to the end cell; and
   a terminal which is formed integrally with the terminal plate and configured to output electrical energy generated by the fuel cell stack to an outside,
   wherein the planar heating element performs a heating operation by being supplied with electric power from a power source,
   wherein the power source is the fuel cell stack, and performs the heating operation by being supplied with electric power generated by the fuel cell stack,
   wherein the terminal penetrates the planar heating element,
   wherein the planar heating element is not exposed to outside the case, and
   wherein the electric power generated by the fuel cell stack is supplied to the planar heating element through a connector installed in the case.

2. The end cell heater assembly of claim 1, wherein bypass flow paths, which communicate with an air inlet manifold or a hydrogen inlet manifold of the fuel cell stack, are formed in the case, and the bypass flow paths respectively communicate with the air outlet manifold or the hydrogen outlet manifold of the fuel cell stack, and are provided to discharge air or hydrogen passing through the interior of the bypass flow paths to respective outlet manifolds.

3. The end cell heater assembly of claim 1, wherein, in the case,
   an air inlet manifold hole communicating with an air inlet manifold of the fuel cell stack, or a hydrogen inlet manifold hole communicating with a hydrogen inlet manifold of the fuel cell stack, is provided,
   an air outlet manifold hole communicating with an air outlet manifold of the fuel cell stack, or a hydrogen outlet manifold hole communicating with a hydrogen outlet manifold of the fuel cell stack, is provided, and
   an air bypass flow path connecting the air inlet manifold hole and the air outlet manifold hole, or a hydrogen bypass flow path connecting the hydrogen inlet manifold hole and the hydrogen outlet manifold hole, is provided.

4. The end cell heater assembly of claim 1, wherein the case comprises an electrically non-conductive material.

5. The end cell heater assembly of claim 1, wherein the case comprises an electrically and thermally non-conductive material.

6. The end cell heater assembly of claim 1, further comprising:
   a thermal insulation pad which is stacked and interposed between the planar heating element and an inner surface of the accommodating groove of the case.

7. The end cell heater assembly of claim 1, wherein the planar heating element includes:
   a heating element which performs a-the heating operation by being supplied with electric power from a-the power source; and a sheath which covers the heating element so as to electrically insulate the heating element from the outside.

8. The end cell heater assembly of claim 1, wherein the terminal penetrates the case and the end plate from the terminal plate.

9. The end cell heater assembly of claim 1, wherein a temperature sensor is installed on the planar heating element, and a controller receives a signal from the temperature sensor and controls an operation of the planar heating element.

10. The end cell heater assembly of claim 1, wherein the planar heating element is a heating element using a Positive Temperature Coefficient (PTC) element.

11. A fuel cell stack comprising:
a plurality of fuel cells which is provided by being stacked, and generates electrical energy through an electrochemical reaction by being supplied with reactant gases;
end plates which are stacked at both end positions of the fuel cell stack outside the stacked fuel cells; and
an end cell heater assembly stacked and interposed between end cells positioned at both ends among the stacked fuel cells, and end plates at both ends of the fuel cell stack so as to provide heat to the respective end cells to increase a temperature of the end cells, and having a bypass flow path so that at least one gas of air and hydrogen supplied to the fuel cell stack as reactant gases is distributed to and passes through the bypass flow path,
wherein the end cell heater assembly uses a power source which is generated from the fuel cell stack,
wherein the end cell heater assembly includes:
a case having a first surface joined to the end plate;
a planar heating element installed in an accommodating groove formed in a second surface of the case;
a terminal plate which is stacked and interposed between the planar heating element and one of the end cells, joined and electrically connected to the one of the end cells, and transferring heat generated by the planar heating element to the one of the end cells; and
a terminal which is formed integrally with the terminal plate and configured to output electrical energy generated by the fuel cells including the one of the end cells to an outside,
wherein the terminal penetrates the planar heating element,
wherein the planar heating element is not exposed to outside the case, and
wherein the electrical energy generated by the fuel cells is supplied to the planar heating element through a connector installed in the case.

12. The fuel cell stack of claim 11, wherein bypass flow paths communicating with an air inlet manifold or a hydrogen inlet manifold of the fuel cell stack so that air or hydrogen from the air inlet manifold or the hydrogen inlet manifold is distributed to and passes through the bypass flow paths, are formed in the case, and the respective bypass flow paths communicate with an air outlet manifold or a hydrogen outlet manifold of the fuel cell stack, and are provided to discharge air or hydrogen passing through the interior of the bypass flow paths to respective outlet manifolds.

13. The fuel cell stack of claim 11, wherein, in the case,
an air inlet manifold hole communicating with an air inlet manifold of the fuel cell stack, or a hydrogen inlet manifold hole communicating with a hydrogen inlet manifold of the fuel cell stack, is provided,
an air outlet manifold hole communicating with an air outlet manifold of the fuel cell stack, or a hydrogen outlet manifold hole communicating with a hydrogen outlet manifold of the fuel cell stack, is provided, and
an air bypass flow path connecting the air inlet manifold hole and the air outlet manifold hole, or a hydrogen bypass flow path connecting the hydrogen inlet manifold hole and the hydrogen outlet manifold hole, is provided.

14. The fuel cell stack of claim 11, wherein the case is made of an electrically non-conductive material.

15. The fuel cell stack of claim 11, wherein the case is made of an electrically and thermally non-conductive material.

16. The fuel cell stack of claim 11, further comprising:
a thermal insulation pad which is stacked and interposed between the planar heating element and an inner surface of the accommodating groove of the case.

17. The fuel cell stack of claim 11, wherein the planar heating element includes:
a heating element which performs a heating operation by being supplied with electric power; and
a sheath which covers the heating element so as to electrically insulate the heating element from the outside.

18. The fuel cell stack of claim 11, wherein the terminal penetrates the case and the end plate from the terminal plate.

19. The fuel cell stack of claim 11, wherein a temperature sensor is installed on the planar heating element, and a controller receives a signal from the temperature sensor and controls an operation of the planar heating element.

20. The fuel cell stack of claim 11, wherein the planar heating element is a heating element using a Positive Temperature Coefficient (PTC) element.

21. The fuel cell stack of claim 11, wherein the end cell heater assembly uses an autonomous power source of the fuel cell stack, and performs the heating operation by being supplied with electrical energy generated by the fuel cells as the electric power.

* * * * *